United States Patent
Prakash

(10) Patent No.: US 7,373,385 B2
(45) Date of Patent: May 13, 2008

(54) METHOD AND APPARATUS TO BLOCK SPAM BASED ON SPAM REPORTS FROM A COMMUNITY OF USERS

(75) Inventor: Vipul Ved Prakash, San Francisco, CA (US)

(73) Assignee: Cloudmark, Inc., San Francisco, CA (US)

( * ) Notice: Subject to any disclaimer, the term of this patent is extended or adjusted under 35 U.S.C. 154(b) by 746 days.

(21) Appl. No.: 10/700,911

(22) Filed: Nov. 3, 2003

(65) Prior Publication Data

US 2005/0114452 A1 May 26, 2005

(51) Int. Cl.
*G06F 15/16* (2006.01)
(52) U.S. Cl. ................ 709/206; 709/203; 709/217; 709/223
(58) Field of Classification Search .......... 709/206, 709/207, 203, 217, 223, 224
See application file for complete search history.

(56) References Cited

U.S. PATENT DOCUMENTS

| 6,421,709 | B1 * | 7/2002 | McCormick et al. | 709/206 |
|---|---|---|---|---|
| 6,453,327 | B1 * | 9/2002 | Nielsen | 715/500 |
| 7,117,358 | B2 * | 10/2006 | Bandini et al. | 713/153 |
| 7,222,157 | B1 * | 5/2007 | Sutton et al. | 709/206 |
| 2004/0167968 | A1 * | 8/2004 | Wilson et al. | 709/207 |
| 2004/0177110 | A1 * | 9/2004 | Rounthwaite et al. | 709/202 |
| 2004/0177120 | A1 * | 9/2004 | Kirsch | 709/206 |
| 2004/0236839 | A1 | 11/2004 | Wilson et al. | |
| 2006/0031303 | A1 | 2/2006 | Pang | |

OTHER PUBLICATIONS

International Search Report for PCT/US2004/036755 mailed Apr. 12, 2007. 5 pages.
Written Opinion for the International Searching Authority for PCT/US2004/036755 mailed Apr. 12, 2007. 3 pages.
Sahami et al. "A Bayesian Approach to Filtering Junk E-Mail". 8 pages/, 1998.
"Vipul's Razor v2 README", Aug. 18, 2003. http://www.brics.dk/~engberg/usr_local_doc/razor-agents-shr-2.34/README. 3 pages.
"Classifier Systems Abstracts", Troels' Home Page Classifier Systems. http://www.3.brinkster.com/troels/classifier.asp. Aug. 26, 2003. 5 pages.
"Genetic Algorithms Abstracts", Troels' Home Genetic Algorithms. http://www.3.brinkster.com/troels/genealgo.asp. Aug. 26, 2003. 4 pages.
"A Plan for Spam". Aug. 2002. http://www.paulgraham.com/spam/html. Aug. 26, 2003. 13 pages.

* cited by examiner

*Primary Examiner*—LaShonda T Jacobs
(74) *Attorney, Agent, or Firm*—Schwegman, Lundberg & Woessner P.A.

(57) ABSTRACT

In one embodiment, a method for operating a server is provided. The method comprises receiving a plurality of reports from a community of users, each report identifying an email message as spam or not spam; and determining if the email message is spam based on a number of the reports received from the community of users, and a trust factor associated with each user.

21 Claims, 5 Drawing Sheets

METHOD AND APPARATUS TO BLOCK SPAM BASED ON SPAM REPORTS FROM A COMMUNITY OF USERS

FIELD OF THE INVENTION

This invention relates to a method and system for filtering bulk unsolicited email (electronic mail) messages known as spam.

BACKGROUND

The use of spam to send advertisements to email users is becoming increasingly popular. Like its paper-based counterpart—junk mail, receiving spam is annoying.

Therefore, considerable effort is being brought to bear on the problem of filtering spam before it reaches the in-box of a user.

Currently, rule-based filtering systems that use rules written by a human to filter spam are available. As examples of the rules, consider the following rules:

(a) "if the subject line has the phrase "make money fast" then mark as spam;" and (b) "if the from field is blank, then mark as spam."

Usually thousands of such specialized rules are necessary in order for a rule-based filtering system to be effective in filtering spam. Each of these rules are written by a human, which adds to the cost of rule-based filtering systems.

Another problem is that senders of spam (spammers) are adept at changing spam to render the rules ineffective. For example consider the rule (a), above. A spammer will observe that spam with the subject line "make money fast" is being blocked and could, for example, change the subject line of the spam to read "make money quickly." This change in the subject line renders rule (a) ineffective. Thus, a human would need to write a new rule to filter spam with the subject line "make money quickly." In addition, the old rule (a) will still have to be retained by the system.

With rule-based filtering systems, each incoming email message has to be checked against thousands of active rules. Therefore, rule-based filtering systems require fairly expensive hardware to support the intensive computational load of having to check each incoming electronic mail message against the thousands of active rules. Further, the human intensive nature of rule writing adds to the cost of rule-based systems. The term "email" as used herein is to be interpreted broadly to include any type of electronic message including voicemail messages, short message service (SMS) messages, multi-media messaging service (MMS) messages, facsimile messages, etc.

SUMMARY OF THE INVENTION

According to one aspect of the invention, there is provided a method for operating a server. The method comprises receiving a plurality of reports from a community of users, each report identifying an email message as spam or not spam; and determining if the email message is spam based on a number of the reports received from the community of users, and a trust factor associated with each user.

DETAILED DESCRIPTION

Embodiments of the present invention provide a collaborative anti-spam system that may be used to block spam from reaching an incoming mail folder of a user. The system does not rely on rules to identify spam. Instead the system identifies or marks particular email messages as spam based on input from a community of users of the system. The input is in the form of spam reports from the users that indicate whether a particular message is spam. If a message is determined to be spam, then the entire community of users is notified that the message is spam. The message may then be prevented from reaching the incoming mail folder of each user.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
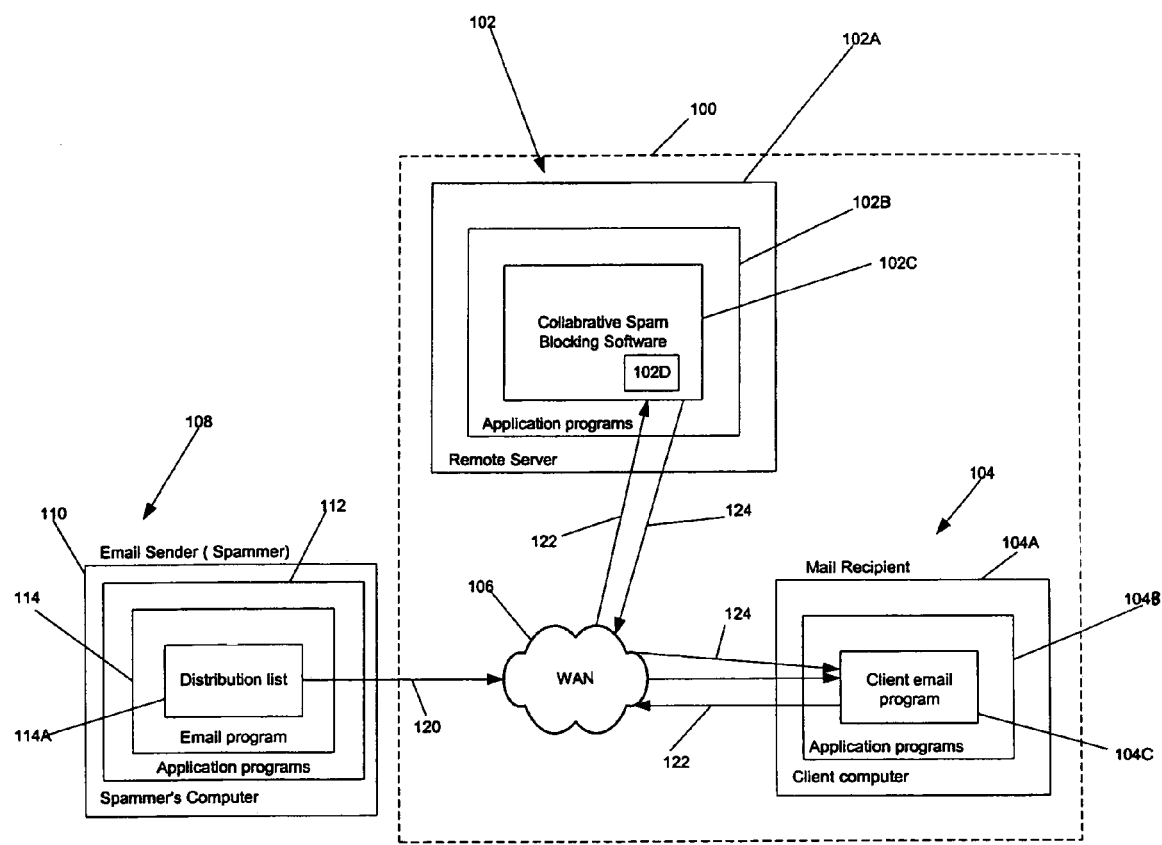
FIG. 1 shows a high-level block diagram of the components of a collaborative anti-spam system, in accordance with one embodiment of the invention.

Referring now to FIG. 1 of the drawings, reference numeral 100 generally indicates the components of a collaborative anti-spam system (also known as "spamnet") in accordance with one embodiment of the invention. The spamnet 100 includes a spamnet server 102 which is connected to a plurality of mail recipients 104 (only one of which is shown) via an intermediate wide area network (WAN) 106. In one embodiment, the WAN 106 may take the form of a well-known internet.

The spamnet server 102 includes server hardware 102A, and one or more application programs 102B which includes collaborative spam blocking software 102C. The software 102C includes a database 102D.

The mail recipient 104 includes client computer hardware 104A, and one or more application programs 104B, which includes a client email program 104C. The client computer hardware 104A may be any electronic device capable of sending and receiving emails. For example, the client machine 102 may be a mobile telephone, or Personal Digital Assistant (PDA), a Pocket PC, a 2-way pager, etc.

A more detailed description of the components making up the server 102, and mail recipient 104 is provided with reference to FIG. 4, below.

FIG. 1 of the drawings also shows a block diagram of an email sender (spammer) 108. As will be seen, the email sender 108 includes computer hardware 110 which is under control of one or more application programs 112. Of interest here is an email program 114 that includes a distribution list 114A. The distribution list 114A includes the email addresses of a number of mail recipients 104. The email sender 108 uses the distribution list 114A to send spam via the wide area network 106 to each of the mail recipients 104 whose email address appears in the distribution list 114A. The spam sent by the email sender 108 to the mail recipient 104 is indicated by reference numeral 120 in FIG. 1.

In accordance with one embodiment of the invention, and in response to receiving the spam 120, the client email program 104C sends a request 122 to the collaborative spam blocking software 102C via the WAN 106. The request 122 is to determine if the email message 120 is spam. In one embodiment, the request includes a signature or hash calculated based on a content of the email message 120. In some cases, the request 122 may include more than one signature, for example three signatures, based on the content. In response to the request, in accordance with one embodiment, the collaborative spam blocking software 102C determines if the message 120 is spam and sends a notification 124 (via the WAN 106) to the client email program 104C to notify the client email program 104C that the message 120 is spam. In one embodiment, as will be explained in greater detail below, the software 102C determines if the message 120 is spam by using the signatures in the request 122 as a key to search a spam database 102D which contains signatures corresponding to messages previously identified as spam by the community.

Figure 2:
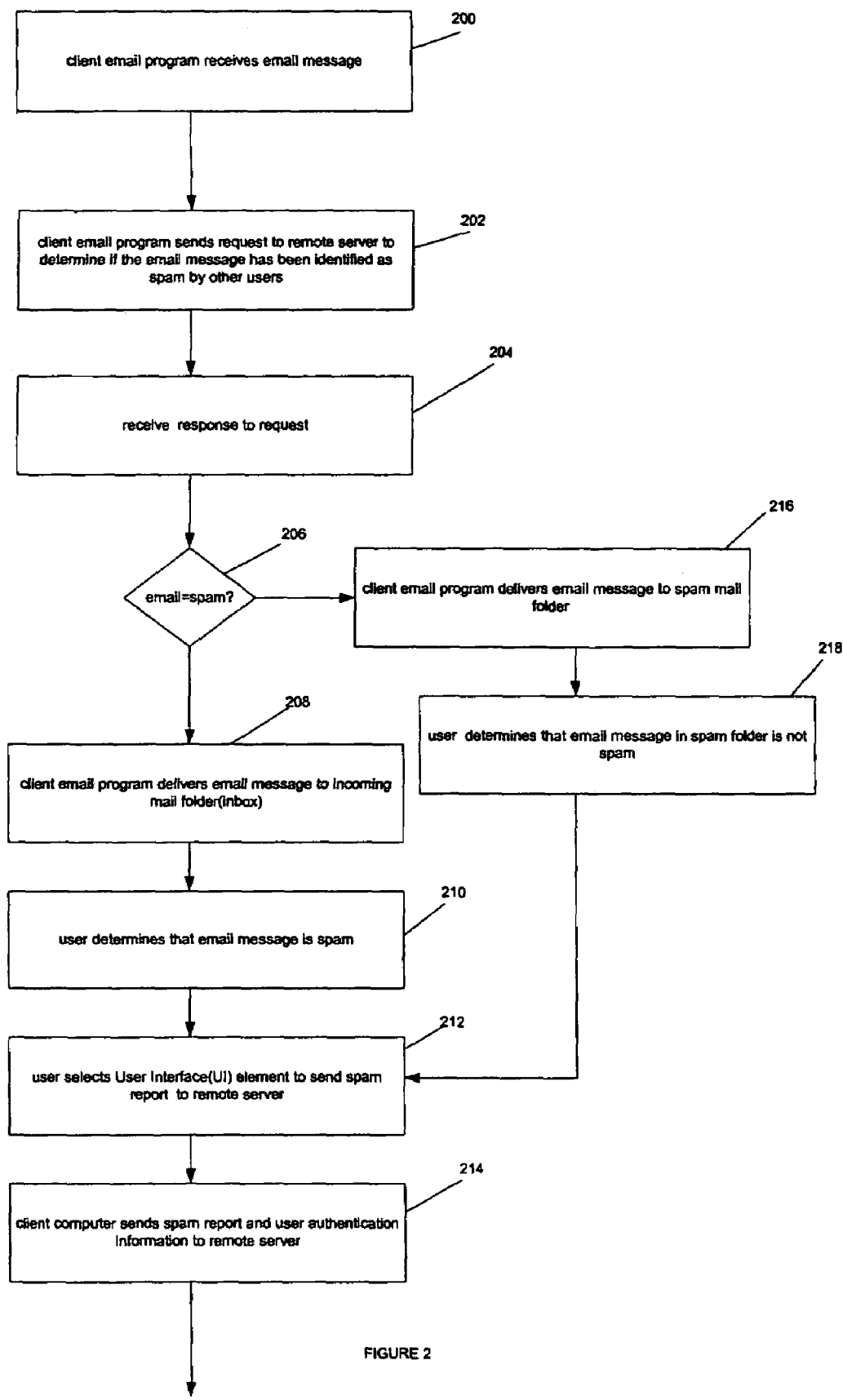
FIG. 2 shows a flowchart of operations performed at a client computer, in accordance with one embodiment of the invention.

Referring now to FIG. 2 of the drawings, a flowchart of operations performed at the mail recipient 104 in accordance with one embodiment of the invention is shown. Starting at block 200, the client email program 104C receives an email message. For the purposes of this discussion, it is assumed that the email message is the spam 120 (see FIG. 1) sent by the spammer 108 using the distribution list 114A. At block 202, the client email program 104C sends a request via the WAN 106 to a remote server, e.g., the spamnet server 102. The request is indicated by reference numeral 122 in FIG. 1. The purpose of the request 122 is to determine if the email message 120 is spam. At block 204, the client email program 104C receives a response to the request 122 from the remote server. The response is in the form of the notification 124 shown in FIG. 1 of the drawings. In one embodiment, the notification includes an indication of whether the email message or a signature corresponding to the email message was found in the spam database 102D.

At block 206, the client email program 104C determines from the notification 124 whether the email message 120 is spam. If the email message is not spam, then block 208 is executed, wherein the client email program 104C delivers the email message 120 to an incoming mail folder or mailbox. A user may then read the email message 120 in the incoming mail folder. Thereafter block 210 executes, wherein the user determines whether the email message 120 in the incoming mail folder is spam. The user may perform this determination by examining the subject line of the email message 120. Alternatively, the user may make this determination based on the body of the email message 120. The determination is a visual determination performed by the user, and thus does not require any rule to be written, to determine if the email message 120 is spam.

Once the user determines that the email message 120 is spam, then at block 212, the user selects a user interface (UI) element to send a spam report to the remote server. In one embodiment, the UI element may include a "block" button (not shown), which when selected by the user causes the client email program 104C to send a spam report to the collaborative spam blocking software 102C via the WAN 106. The spam report is a report that identifies the email message 120 as being spam. In some embodiments, the actual contents of the entire email message 120 is sent as part of the spam report. Alternatively, a unique signature or derivative of the email message 120 is sent to the collaborative spam blocking software 102C.

At 214, the client email program 104C also sends user authentication information to the collaborative spam blocking software 102C. The user authentication information is to authenticate the user of the client email program 104C. In one embodiment, the user identification information may comprise a digital signature of the user of the client email program 104C.

If at block 206, it is determined that the email message 120 is spam, then block 216 executes, wherein the client email program 104C delivers the email message 120 to a spam mail folder of the client computer. Usually the email messages stored in the spam mail folder are not read as frequently by the user as the email messages stored in the incoming mail folder. However, the user may periodically review the email messages stored in the spam mail folder. This is done at block 218. The purpose of such a review is to identify messages stored in the spam folder which may have been erroneously or incorrectly identified as spam. If after execution of block 218, the user determines that a particular email message in the spam folder was incorrectly identified as spam, then at block 212, the user may send a spam report to the remote server to indicate to the remote server that the particular email message stored in the spam folder is not spam. If a sufficient number of other users also send spam reports to indicate that the particular email message is not spam, then the software 102C may remove the particular email message or its signature from the spam database 102D.

Figure 3:
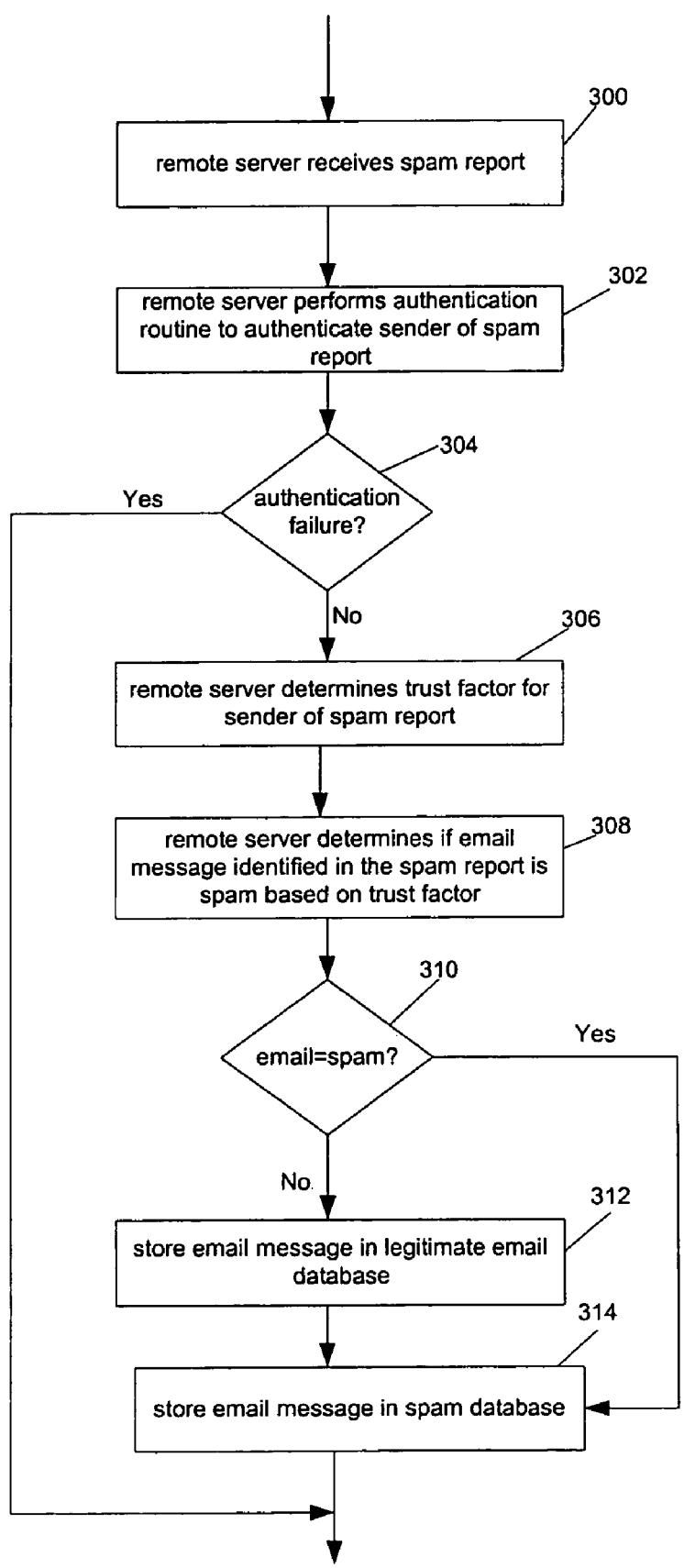
FIGS. 3A and 3B of the drawings show flowcharts of operations performed by a remote server, in accordance with one embodiment of the invention.

FIG. 3A of the drawings shows a flowchart of operations performed by the spamnet server (remote server) 102 in accordance with one embodiment of the invention. Referring to FIG. 3A, at block 300, the spamnet server 102 receives a spam report from a mail recipient 104. As noted above, the spam report identifies or suggests a particular email message as being spam. This spam report may include the entire contents of the email message or merely a signature or derivative of the email message sufficient to uniquely identify the email message. Also at block 300, the spamnet server 102 receives authentication information to authenticate the sender of the spam report. Thereafter at block 302, the spamnet server 102 performs an authentication routine to authenticate the sender of the spam report. As noted above, in one embodiment, the authentication information may comprise a digital signature of the sender. Thus, the authentication routine involves operations to validate the digital signature.

At block 304, the spamnet server 102 determines if the authentication procedure was successful. If the authentication procedure was unsuccessful then operations shown in FIG. 3 of the drawings terminate. If the authentication procedure was successful, then block 306 executes, wherein the spamnet server 102 determines a trust factor for the sender of the spam report. The trust factor provides an indication of how much weight to attach to the spam report of the sender. For example, if in the past the sender of the report sent spam reports that accurately identified email messages as spam, then such a sender will enjoy a high trust factor. Accuracy of the spam report is determined by the degree of consensus between the various mail recipients 104 within the spamnet 100 as to what email messages are spam. If on the other hand, the sender of the spam report had sent prior spam reports and the consensus of the other mail recipients 104 in the spamnet 100 that emails identified in the reports were spam was low, then such a sender will enjoy a low trust factor. Users of the spamnet 100 are each assigned a trust factor based on agreement between the users on what is considered to be spam.

Thereafter at block 308, the collaborative spam blocking software 102C determines if an email message identified in the spam report is spam, based on a combination of a number of other such reports received from other mail recipients 104 (i.e., the software 102C evaluates the degree of consensus between the other mail recipients 104 that the email message identified in the spam report is spam) and the respective trust factors. In one embodiment, the email message is assigned a confidence rating based on the trust factors of users who reported or nominated the email message as spam. At block 310, if the email message is assigned a confidence rating which is below a threshold the email message is not considered to be spam. The threshold may be, in one embodiment an "average confidence" which is empirically determined. At block 312, the email message is stored in a legitimate email database if the confidence rating assigned to the email message is below the threshold. If the confidence rating assigned to the email message is greater than the threshold, then the email message is treated as spam and is accordingly stored in a spam database at block 314. Based on incoming spam reports, an email message stored in the legitimate email database may subsequently be assigned a confidence rating which is greater than the threshold. If this happens, then the email message is considered to be spam.

Figure 3B:
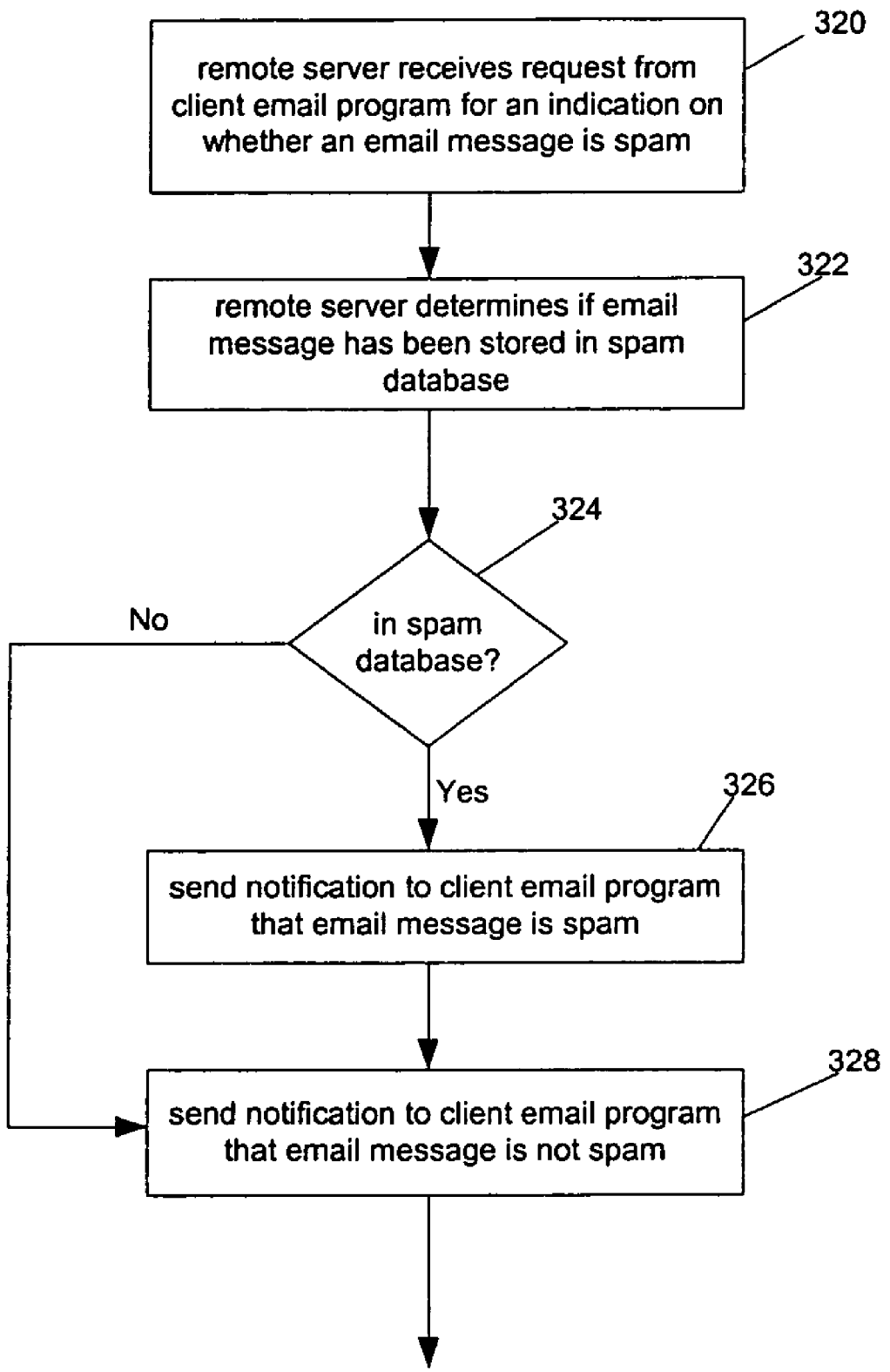

Referring now to FIG. 3B of the drawings, there is shown a flowchart of operations performed by the spamnet server 102, in accordance with an additional embodiment of the invention. Operations shown in FIG. 3B start at block 320, wherein the spamnet server 102 receives a request from a client email program 104C, for an indication on whether an email message is spam or not. Such a request is indicated by the reference numeral 122 in FIG. 1 of the drawings. As noted above, the request 122 may include or one or more signatures calculated based on the content of the email message. Thereafter at block 322, the spamnet server 102 determines if an email message identified in the request 122 has been stored in the spam database. At block 324, if the email message or the signatures based on the email message has been stored in the spam database 102D then block 326 executes, wherein a notification 124 is sent to the client email program 104C to indicate that the email or a derivative or signature of the email message is spam. If, however, at block 324 it is determined that the email message has not been stored in the database 102D, then block 328 executes, wherein the collaborative spam blocking software 102C sends a notification 124 to the client email program 104C to notify the program that the email message has not previously been identified as spam. As noted above, with reference to FIG. 2 of the drawings, the client email program 104C responds to the notification 124 by placing the email message in the spam mail folder or the incoming mail folder based on the notification 124.

The operations described with reference to FIG. 2 of the drawings are performed by the mail recipients 104 within a community of mail recipients. As noted above, the mail recipients 104 determine whether a mail message is spam or not. Email messages determined to be spam are reported to a remote server, i.e., the spamnet server 102, which then uses the information to send notifications to other mail recipients 104 within the community to indicate that the email message is spam. One advantage of the present invention is that email messages are determined to be spam based on a trust factor associated with a sender of a spam report. If the sender has a low trust factor, then a spam report may be ignored. Alternatively, if the sender has a high trust factor, then the report may be used as a basis for determining that the email message contained in the report is spam. Thus, if a spammer tries to send reports to remove spam from the spam database 102D, then over time the spammer will be assigned a low trust factor. This reduces the effectiveness of spammers trying to remove spam messages from the spam data 102D.

In one embodiment, the collaborative spam blocking software 102C maintains statistics for each mail recipient 104 within the community of mail recipients. The statistics are used to provide a history of the degree of consensus between a particular mail recipient 104 and the rest of the mail recipients 104 in the community of mail recipients regarding what messages constitute spam. The statistics are used to determine the trust factor.

Figure 4:
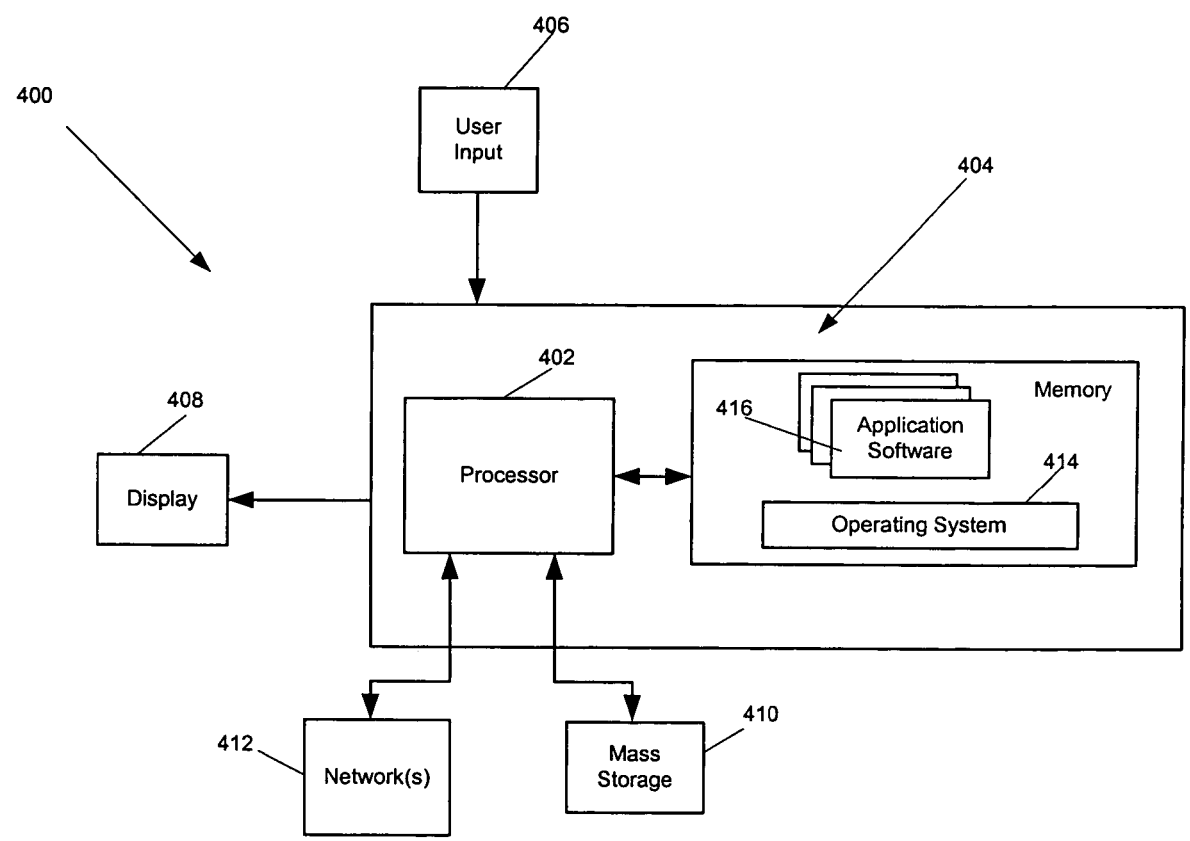
FIG. 4 shows a high-level block diagram of the components of a remote server, in accordance with one embodiment of the invention.

Referring to FIG. 4 of the drawings, reference numeral 400 generally indicates hardware that may be used to implement the server 102 and mail recipient 104, in accordance with one embodiment. The hardware 400 typically includes at least one processor 402 coupled to a memory 404. The processor 402 may represent one or more processors (e.g., microprocessors), and the memory 404 may represent random access memory (RAM) devices comprising a main storage of the hardware 400, as well as any supplemental levels of memory e.g., cache memories, non-volatile or back-up memories (e.g. programmable or flash memories), read-only memories, etc. In addition, the memory 404 may be considered to include memory storage physically located elsewhere in the hardware 400, e.g. any cache memory in the processor 402, as well as any storage capacity used as a virtual memory, e.g., as stored on a mass storage device 410.

The hardware 400 also typically receives a number of inputs and outputs for communicating information externally. For interface with a user or operator, the hardware 400 may include one or more user input devices 406 (e.g., a keyboard, a mouse, etc.) and a display 408 (e.g., a Cathode Ray Tube (CRT) monitor, a Liquid Crystal Display (LCD) panel).

For additional storage, the hardware 400 may also include one or more mass storage devices 410, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 412 (e.g., a local area network (LAN), a wide area network (WAN), a wireless network, and/or the Internet among others) to permit the communication of information with other computers coupled to the networks. It should be appreciated that the hardware 400 typically includes suitable analog and/or digital interfaces between the processor 402 and each of the components 404, 406, 408 and 412 as is well known in the art.

The hardware 400 operates under the control of an operating system 414, and executes various computer software applications 416, components, programs, objects, modules, etc. (e.g. a program or module which performs operations as shown in FIGS. 2, 3A, and 3B of the drawings). Moreover, various applications, components, programs, objects, etc. may also execute on one or more processors in another computer coupled to the hardware 400 via a network 412, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of signal bearing media used to actually effect the distribution. Examples of signal bearing media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Aspects of the present invention have been described with reference to a single spamnet server 102. However, it is to be understood that the methodologies described herein may be implemented using a single server or a plurality of servers. In one embodiment, the spamnet 100 may include a typology comprising a "discovery" a "nomination" and "catalog" server. The discovery, nomination and catalog servers together define a backend which may be used to determine if an email message is spam, in the manner already described. It is important to appreciate, that this backend is scaleable and is attributable over a cluster of servers. In one embodiment, the discovery servers maintain a list of available nomination and catalog servers, sorted by QoS (Quality of Servers). A client computer may be configured to choose a server that is both available and provides the best quality of servers at a given time. The nomination servers are used to authenticate client machines and to receive spam reports nominating or reporting a particular emails as spam. The spamnet 100 checks against the entries stored in the catalog servers to determine if an email message is spam, in accordance with the above described techniques.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
a community of users generating a plurality of reports, said generating comprising, for each of the plurality of reports,
generating at least one signature based on a content of an email message,
adding the at least one signature to a respective report; and
identifying the email message as spam or not spam in the respective report;
receiving the plurality of reports from the community of users; and
determining if the email message is spam based on a number of the reports received from the community of users, and a trust factor associated with each user.

2. The method of claim 1, further comprising maintaining a database of email messages determined as being spam.

3. The method of claim 2, further comprising providing notifications to the community of users of email messages stored in the database and determined as being spam.

4. The method of claim 2, further comprising:
using the at least one signature as a key to store the email message in the database if the email message is determined to be spam.

5. The server of claim 2, wherein the method further comprises:
using the at least one signature as a key to store the email message in the database if the email message is determined to be spam.

6. The method of claim 3, wherein each notification is in response to a request received from a user in the community for an indication on whether an identified message is spam.

7. The method of claim 1, wherein the trust factor is based on an indication of how accurately previous reports sent by the user identified email messages as spam.

8. The method of claim 1, wherein the at least one signature comprises a hash calculated based on the content of the email message.

9. A server, comprising:
a processor; and
a memory coupled to the processor, the memory storing instructions which when executed by the processor cause the processor to perform a method, comprising:
generating a plurality of reports in response to requests from a community of users, said generating comprising, for each of the plurality of reports,
generating at least one signature based on a content of an email message,
adding the at least one signature to a respective report; and
identifying the email message as spam or not spam in the respective report;
receiving the plurality of reports from the community of users; and
determining if the email message is spam based on a number of the reports received from the community of users, and a trust factor associated with each user.

10. The server of claim 9, wherein the method further comprises maintaining a database of email messages determined as being spam.

11. The server of claim 10, wherein the method further comprises providing notifications to the community of users of email messages stored in the database and determined as being spam.

12. The server of claim 11, wherein each notification is in response to a request received from a user in the community for an indication on whether an identified message is spam.

13. The server of claim 9, wherein the trust factor is based on an indication of how accurately previous reports sent by the sender identified email messages as spam.

14. The server of claim 9, wherein the at least one signature comprises a hash calculated based on the content of the email message.

15. A recordable-type medium having stored thereon a sequence of instructions which when executed by a computer, cause the computer to perform a method comprising:
generating a plurality of reports in response to requests from a community of users, said generating comprising, for each of the plurality of reports,
generating at least one signature based on a content of an email message,
adding the at least one signature to a respective report; and
identifying the email message as spam or not spam in the respective report;
receiving the plurality of reports from the community of users; and
determining if the email message is spam based on a number of the reports received from the community of users, and a trust factor associated with each user.

16. The recordable-type medium of claim 15, wherein the method further comprises maintaining a database of email messages determined as being spam.

17. The recordable-type medium of claim 16, wherein the method further comprises providing notifications to the community of users of email messages stored in the database and determined as being spam.

18. The recordable-type medium of claim 16, wherein the method further comprises:
using the at least one signature as a key to store the email message in the database if the email message is determined to be spam.

19. The recordable-type medium of claim 17, wherein each notification is in response to a request received from a user in the community for an indication on whether an identified message is spam.

20. The recordable-type medium of claim 16, wherein the trust factor is based on an indication of how accurately previous reports sent by the sender identified email messages as spam.

21. The recordable-type medium of claim 15, wherein the at least one signature comprises a hash calculated based on the content of the email message.

* * * * *